Nov. 3, 1964  S. M. RUBENS ETAL  3,155,561
METHODS FOR MAKING LAMINATED STRUCTURES
Filed March 7, 1960  3 Sheets-Sheet 1

INVENTORS
SIDNEY M. RUBENS
ARTHUR V. POHM
CHARLES D. OLSON
BY Cushman, Darby & Cushman
ATTORNEYS Nov. 3, 1964  S. M. RUBENS ETAL  3,155,561
METHODS FOR MAKING LAMINATED STRUCTURES
Filed March 7, 1960  3 Sheets-Sheet 2

INVENTORS
SIDNEY M. RUBENS
ARTHUR V. POHM
CHARLES D. OLSON

BY Cushman, Darby & Cushman
ATTORNEYS

Nov. 3, 1964    S. M. RUBENS ETAL    3,155,561
METHODS FOR MAKING LAMINATED STRUCTURES
Filed March 7, 1960    3 Sheets-Sheet 3

INVENTORS
SIDNEY M. RUBENS
ARTHUR V. POHM
CHARLES D. OLSON

BY *Cushman, Darby & Cushman*
ATTORNEYS

United States Patent Office 3,155,561
Patented Nov. 3, 1964

3,155,561
METHODS FOR MAKING LAMINATED
STRUCTURES
Sidney M. Rubens, St. Paul, Minn., Arthur V. Pohm, Ames, Iowa, and Charles D. Olson, St. Paul, Minn., assignors to Sperry Rand Corporation, New York, N.Y., a corporation of Delaware
Filed Mar. 7, 1960, Ser. No. 13,361
7 Claims. (Cl. 156—273)

This invention relates to the process of forming laminated articles, particularly those which are usable in electrical matrices such as magnetic memories or the like, and is a continuation-in-part of the copending application, Serial No. 626,945, filed December 7, 1956, by S. M. Rubens et al., now U.S. Patent No. 3,030,612.

In that parent application and in the present application, there is described a magnetic device which includes either one or a plurality of thin magnetic films in conjunction with layers of printed circuitry forming windings through which current may be passed for the purpose of changing the state of the film or films, or sensing a state thereof. The films may be of the type produced by the method described and claimed in Rubens Patent No. 2,900,282 in which case they have uniaxial anisotropy, i.e., they have a single easy axis of magnetization and a single difficult axis of magnetization which is oriented transversely of the easy axis. The easy axis of the film as produced in accordance with the method in the said Rubens patent, is caused by the deposition of the film in a magnetic field, the easy axis resulting in the plane of the film along a line parallel with the direction of the applied field.

A single magnetic film along with a plurality of windings, which are adjacent printed circuit layers of conductive material such as copper, can be employed as single element storage devices for gating purposes or the like, as can be any single toroidal core device. In like manner, a plurality of discrete magnetic films all on a given substrate in conjunction with layers of windings each having its own particular configuration, and being disposed above and/or below the film substrate, can be employed in the same way as magnetic toroidal core matrices or arrays.

In accordance with this invention, such thin film devices or arrays are produced by sequentially evaporating different layers of material in vacuum until the final desired product is produced. As an alternative thereto, the product may be formed by successive adherence of the different layers of insulation and conductive material, with each conductive layer being masked and "printed" to form the desired winding configuration.

It is, therefore, an object of this invention to provide a method for producing laminated electrical devices which include alternate layers of insulation and printed circuitry.

Another object of this invention is to provide a method in conjunction with the preceding method, of forming a laminated device which includes a layer containing at least one magnetic film.

Further objects and the entire scope of the invention will become more fully apparent from the following description and from the appended claims. The invention can be best understood with reference to the accompanying drawings, wherein:

A general aspect of the present invention is the discovery that a complete magnetic device can be constructed by making a sandwich of a layer of square loop type magnetic material, which preferably has uniaxial anisotropy, and adjacent layers of conductors and interposed insulators. As will become fully apparent herein, it is not required in such a magnetic device that the magnetic material be a condensation-deposition product, but such is preferred and, therefore, this explanation will proceed with reference thereto, but without limitation.

It has been found most advantageous to utilize so-called "printed circuits" for fabricating the electrical conductors. The term "printed circuit" as used herein is intended to include all conducting arrays fabricated by such methods as etching, evaporating, painting, silk screening, etc., which are well known in the art.

As will become fully apparent hereinbelow, many of the principles pertaining to a sandwich magnetic device utilizing only one core can be applied to a coincident current memory system. Several features common to single cores as well as multiple core apparatus will first be described, with reference to FIGURE 1.

One of the major fabrication problems in any device which employs one or more toroidal cores is the stringing of wires through the individual toroids. The instant inventive feature makes possible the production of multilayer printed circuits in place of the difficult stringing technique. For example, thin flat foil conductors or ribbons may be used for the sense, drive, and inhibit leads and windings of coincident current memories. The fields along the surface of the conductors are fairly uniform, and the core elements are placed in close proximity with the conductors.

Figure 1:
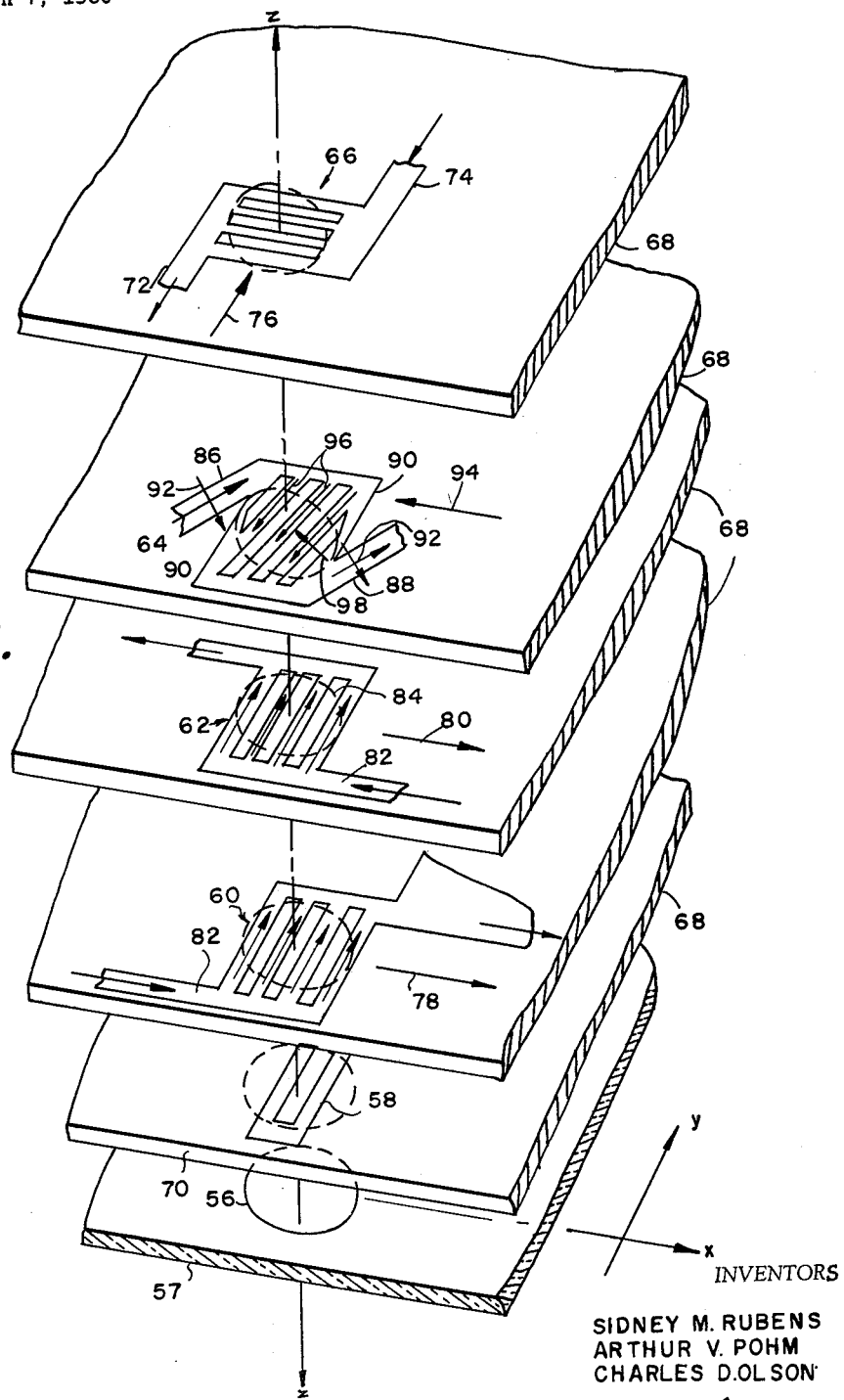
FIGURE 1 illustrates in an exploded view a thin film laminated magnetic device with several insulation and winding layers built in accordance with this invention.

FIGURE 1 shows an exploded view of a sandwich comprising magnetic material according to the instant inventive feature. This can be considered a "bit" or cell position of a memory unit, or alternatively, can be thought of as a view of a single unit for use as an amplifier, switch, gate, or the like. The magnetic element 56 can be any suitable material, but is preferably a deposited type uniaxial thin film. It is disposed on a substrate 57 such as glass, and windings 58, 60, 62, 64 and 66 with their leads, are laid successively in surfaces substantially parallel with the surface of the magnetic film 56. It is to be noted that each winding is a flat portion of a conductor, which conductor has leads, preferably flat also, for carrying current into and away from the flat portion respectively. Although the area of the flat portions is shown rectangular, no limitation thereto is intended. As will be noted, the approximate center of each winding area lies along the z axis which runs perpendicular to, and from the center of, circular film 56. The x and y axes of film 56 extend at right angles to each other and to the z axis as shown.

It should be understood that while the magnetic elements and printed circuits are herein illustrated as entirely flat and lying within plane surfaces, the surfaces can, in fact, be curved. The main point of the present disclosure, is that a sandwich type device can be constructed in accordance with this invention even if all of the layers of the sandwich be somewhat curved or other than planar. Either form of construction is entirely different from the prior art concept of requiring that the magnetic material close upon itself, and requiring that conductors be threaded through the closed loop of magnetic material.

In the general case, the ribbon-like windings which carry electric current, if there are more than two of them, must be separated by an interposed insulating layer to prevent short-circuiting. If is preferable, although not necessary in some cases, to electrically insulate between the magnetic material 56 and the most proximate winding 58. In any event, it is preferable to coat the film for protective purposes with, for example, silicon monoxide, which coating if made thick enough or supplemented by additional layers of the same or similar type material, will have electrical insulation properties. Suitable interposed insulation layers, in addition to or without such a coating, can be realized in several ways. For example, each of the windings as shown in FIGURE 1 can be etched or otherwise "printed" directly onto backing material of an insulating nature. Instead, if the windings are separate foil members, it is simply required that separate insulating members be provided. If desired, there may be a printed circuit on both sides of a given board, such as windings 58 and 60 on the respective sides of the lowermost insulating panel 68 in FIGURE 1. Additional interposing layers would be used as desired.

As will become more fully apparent hereinbelow, in FIGURE 1 the particular layout of windings 58, 60, 62, 64 and 66 is for use in a coincident current memory. However, for the general case where the element 56 may be the "core" or a portion of the "core" serving any type of magnetic device, the point being made here is that with such a sandwich arangement, electrical current passing through any one of the windings is capable of controlling the state of magnetization of the element 56. The control may be the complete reversal of the state of remanent magnetization, or some lesser degree of change of the magnetization as might be caused by a "half-current." It may be desirable, as in a coincident current memory, to rely upon a predetermined combination of currents in two or more of the windings, to effect a desired control. Conversely, changes in the state of magnetization of the element 56 will have an inductive effect in one or more of the windings. For example, where the sandwich of FIGURE 1 is, in fact, one position of a coincident current memory, it is intended that some combination of currents through windings 60, 62, 64 and 66 can reverse the state of remanent magnetization of the element 56. Also, there is sufficient inductive coupling between element 56 and at least winding 58, to make sensing of changes in magnetization in element 56 possible. In either case, this is based upon the inducing of a voltage in winding 58 whenever element 56 undergoes a change in its state of magnetization. It will be immediately apparent to those skilled in the art that the windings 58, 60, 62, 64 and 66, or a lesser or greater number, can be analogous to the conventional windings on toroidal cores in magnetic devices such as the amplifiers, gates, etc., mentioned above.

Another general aspect of the present invention is the constructing of a coincident current magnetic memory. Such coincident current memory apparatus can utilize at each bit storage position the principles of FIGURE 1. As the description of the coincident current apparatus, which may be made by the present invention, proceeds, certain features will be described which clearly also apply to the making of a sandwich usable as an amplifier, gate, etc.

Continuing to refer to FIGURE 1, now with coincident current memory apparatus particularly in mind, winding 58 is intended as a sense winding, and lies closest to the magnetic element 56 to provide a maximum coupling effect and is preferably held out of electrical contact with element 56 by a layer of insulation 70 which may be similar to layers 68 which separate the other windings.

Following the sense winding is the first drive line winding 60 (which for convenience may be termed a "horizontal" winding), the "vertical" drive line winding 62, an inhibit winding 64, and the transverse field winding 66. As is well known, conventional horizontal and vertical windings with current therethrough provide the half fields in coincident current memories which add to provide a drive or longitudinal switching field unless current is present in the inhibit winding. In accordance with the parent application hereinbefore mentioned, a transverse field may be applied to the magnetic element to cause faster switching. Winding 66 with its input leads 72 and 74 provides a field in the y direction as indicated by arrow 76 when current flows through lead 74 and out through lead 72. With a transverse field 76 acting along with the longitudinal half fields 78 and 80, produced respectively by the horizontal and vertical windings 60 and 62 when current enters them through their respective leads 82, the state of magnetic element 56 shifts by the rotational process. However, if current flows through the inhibit winding 64 so as to effectively cancel one of the fields 78, 80, the state of the magnetic element will not be shifted.

Each of the windings may be slit along their length one or more times in the manner indicated by reference character 84. This prevents eddy currents which otherwise would damp the rotational switching. The leads to the flat rectangular areas of each winding are preferably disposed at right angles thereto so that the magnetic field produced by current through the leads does not adversely affect the magnetic element. However, it may be necessary at times to make the leads enter the flat rectangular area at an acute or obtuse angle thereto such as illustrated for the inhibit winding 64. It must be understood, however, that this angulation may be involved with the other windings, and the inhibit winding 64 is only selected to illustrate this feature. Leads 86 and 88 of the inhibit winding are not perpendicular to the sides 90 of the winding area 64. Therefore, the leads, when current enters the area via lead 86, will produce a flux in the direction of arrows 92. Since the function of the inhibit winding is to counteract the fluxes produced by one of the drive windings, the necessary direction of the total flux produced by inhibit winding 64 is that shown by arrow 94. To obtain such a resultant flux when the leads produce a field, the current through the rectangular area of winding 64 must be in the direction of arrows 96 so that the thereby produced flux 98 when added to flux 92 will produce a field in the direction of vector 94.

As hereinbefore mentioned, the magnetic element 56 in FIGURE 1 is preferably of the type produced by the condensation-deposition method of said Rubens Patent No. 2,900,282. Such films can be produced, each as a single domain in thickness with uniaxial anisotropy, ranging in thickness between 100 and 9500 A. more or less, and with coercivity factors not undesirable in relation to other magnetic properties of the films. Optimum composition films comprising approximately 81.0 percent nickel and the remainder iron, have zero magnetostrictive properties, along their single easy axis of magnetization, and are the type most preferable for use with this invention.

As an example of a practical embodiment of a sandwich type device, similar to that illustrated in FIGURE 1, the following may be considered. The windings and their leads may be made of "one ounce" copper which has a thickness of approximately 1 mil. However, copper one-half mil thick may also be used. The insulation layers 68 and 70 may be of any suitable type, which can be cemented or evaporated onto the films and printed circuits, such as a rubber based phenolic resin type, polyethylene, silicon monoxide, magnesium fluoride, or Mylar, and may be in the order of 4 mils thick. Using a magnetic film of thickness in the order of 2000 A, along with five windings each approximately 1 mil thick and 4 millimeters wide, disposed all on one side of the magnetic film with each of five interposed layers of insulation 4 mils thick, the furthermost winding as well as the ones in between, when traversed by approximately 400 milliamperes of current, will provide a sufficient field to properly affect the magnetization of the magnetic element. It is to be understood that the foregoing example is merely for illustrative purposes, there being no limitation thereto intended.

Although this application illustrates the placing of one set of windings all on one side of the magnetic elements, it will be apparent that a whole set of windings could be on each side or that a part of a set of windings could be on one side while the remainder is on the other. For example, without limitation intended, the sense, vertical and horizontal windings could be placed above the magnetic elements while the inhibit and transverse windings are disposed below. In this manner better inductive effect may be obtained.

Figure 2:
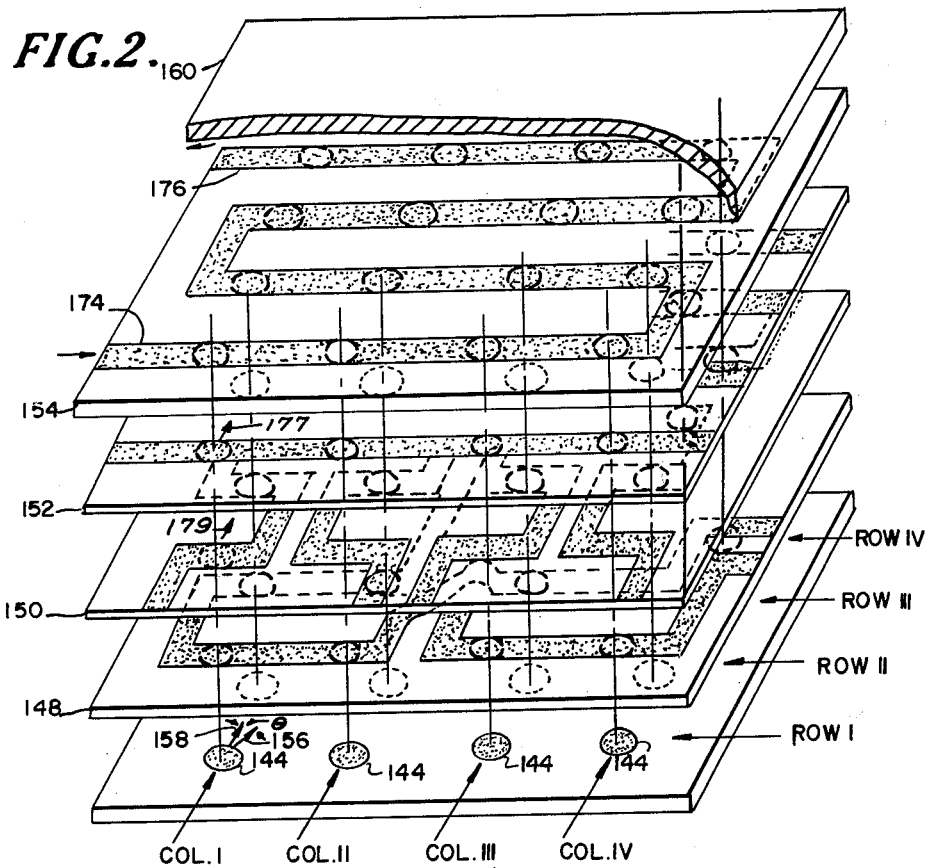
FIGURE 2 is an exploded view of a laminated two dimensional magnetic memory built in accordance with this invention.

As an example of another memory matrix which may be formed in accordance with this invention, FIGURE 2 illustrates a simple and direct method of providing a cross field when selection is determined by the coincidence of currents on two drive line windings. FIGURE 2 shows a preferred embodiment as applied to a typical 4 x 4 memory array, such array including 16 thin magnetic elements 144 arranged four in row I, four in row II, four in row III and four in row IV, as well as four in each of columns I through IV, all the elements having been deposited or otherwise located on a suitable substrate 146 at spaced apart positions as indicated. It is to be understood that FIGURE 2, like FIGURE 1 illustrates a sandwich in an exploded view, whereas normally the adjacent layers would be in physical contact with each other. Immediately disposed above the magnetic elements 144, which may or may not have protective coatings as above mentioned, preferably there is an insulating layer 148 which may be of material similar to insulator 70 of FIGURE 1. On top of the insulator 148 is a printed circuit which is preferably a sense winding, whose configuration may be as in FIGURE 12 or 15 of said parent application with the dotted circles on layer 148 (and subsequent layers) representing elemental areas respectively located in positions corresponding to those of the magnetic elements 144 underneath the sense winding. Insulation layers 150, 152 and 154 separate adjacent windings and the material, and thickness of each layer may be similar to insulator 68 in FIGURE 1. Between insulation layers 150 and 152 there is disposed a plane of printed circuitry, which may be of a configuration such as that shown in FIGURE 13 of the parent application, forming a "vertical" winding whereby a drive field 177 may be formed. A second drive field 179 is created by the printed circuitry ("horizontal" winding) disposed between insulation layers 152 and 154, which circuitry is further shown in schematic detail in FIGURE 14 of the parent application, while the inhibit printed circuitry is above layer 154.

In FIGURE 2, it will be noted that there is no winding for producing the transverse field component. However, such a field component is present because each of the magnetic elements 144 and its easy axis of magnetization, as represented by line 156 lying in the plane of the lower left element, is rotated a predetermined degree (angle $\theta$) as respects the total magnetic field represented by vector 158 as produced by currents through the horizontal and vertical windings. That is, the cross field is provided by orienting the easy magnetization axis of each element at a small angle $\theta$ with respect to the total drive field therefor, thereby allowing the drive field component which is orthogonal to the easy axis of the film to be used as a cross field, all as explained in reference to FIGURE 5 in the parent application.

In FIGURE 2, there is shown an additional layer 160 in broken away form, above the inhibit winding. This "backing" layer is any ferromagnetic material (such as Hipersil, a ferrite, or indeed a deposited, or otherwise made, magnetic film) which has a suitable high degree of permeability at relatively high frequencies and is for the purpose of completing the magnetic flux path associated with the magnetic elements 144. With respect to any one of the magnetic elements 144, layer 160 is of substantially infinite dimension in a plane parallel with the surface of such elements. Since layer 160 acts as a return path for flux, it may serve not only to allow a decrease in the size of the magnetic elements by diminishing the demagnetizing field thereof, but also to cause the inductive effects in a sandwich type device to be more prominent for a given set of currents. It is to be noted that such a backing layer may be used only when the windings are disposed on one side, i.e., above or below a magnetic element, since when windings are placed on both sides of the magnetic element, backing layers would defeat the purposes intended to be served thereby.

It has been found that the lateral variation of the various windings in the printed circuits made in accordance with this invention can be kept in registration to within three or four mils and that the separation of layers can be kept uniform within a mil or two. If a random two mil variation in separation or five mil lateral displacement occurs between the drive lines and the sense winding, at an element position, a net unbalanced linked air flux of about 0.003 line occurs for conducting strips approximately 0/25 inch wide. When an element is selected by the coincidence of currents in a 32 x 32 array, the 62 unselected element positions along the two drive lines (31 along each of the drive lines), which are assumed to have random error variation in their positioning, give on the average an unbalanced mutual coupling signal which would occur only during the rise and fall of the current pulses and would have only one-fourth the voltage integral of the switch signal. By strobing or gating the output signal so as to eliminate the rise and fall periods, good signal-to-noise ratios (at least 10 to 1) can be obtained.

Figure 3:
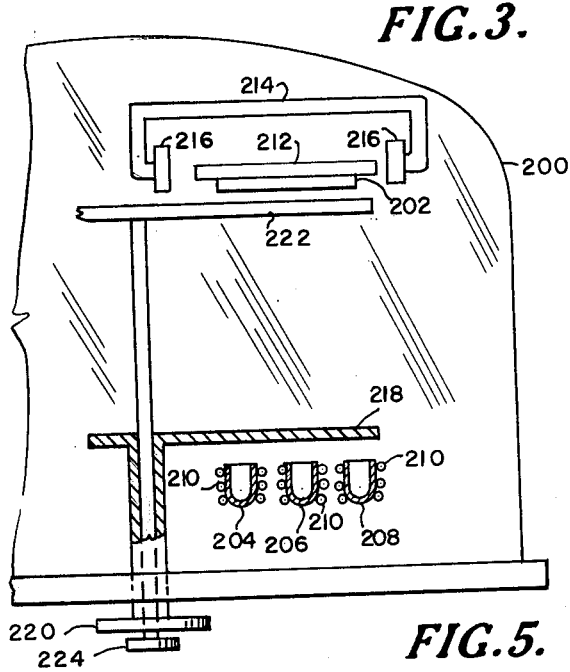
FIGURE 3 is a broken away diagrammatic view of apparatus by which this invention can be carried out.

Apparatus by which any of the foregoing sandwiched or laminated embodiments may be produced by a vacuum deposition method is shown in FIGURE 3. This apparatus is similar to that shown in the Rubens Patent No. 2,900,282, and includes within the bell jar or glass envelope 200 a plurality of crucibles which respectively contain the materials to be evaporated and deposited onto the substrate 202. Crucible 204 may contain the ferromagnetic metal to be melted, and as previously indicated such metal preferably has approximately 82.75% nickel, remainder iron. In crucibles 206 and 208, any desired type of insulation and winding materials may be respectively disposed. Silicon monoxide or magnesium fluoride are two examples of insulation material which may be employed, while copper or aluminum may be used as winding material. Each of the three crucibles has its own high frequency induction heating coil 210 which may be operated to provide the respective melt temperatures required.

The substrate 202 is provided with a heating element 212, while the permanent magnet 214 provides by its pole pieces 216 the required magnetic field across the lower surface of the substrate on which there is first to be deposited one or more discrete thin magnetic films.

In order to deposit the magnetic metal, insulation, and copper windings in the proper sequence with desired configurations a shutter plate 218 which may be rotated by an exteriorly extended shaft with knob 220 and a masking plate 222 which may be rotated by the knob 224, are disposed between the crucibles and substrate. The crucibles and openings (not shown) in the shutter plate 218 are so disposed that there is only one opening over any given crucible at a time, thereby allowing the evaporated melt from that crucible to move upwards toward the substrate. At that particular time the openings (not shown) in the masking plate 222 are such as to give the desired configuration of the instant melt in proper registration as it deposits onto the substrate.

The whole process is carried out in an air vacuum within the envelope or bell jar 200, and may proceed as follows. Following the raising of the substrate heater to a proper temperature, for example within the range of 250° C. to 350° C., and the melting of the metals in the crucibles, shutter plate 218 is rotated so that the copper and insulation crucibles 206, 208 are covered thereby, with an opening in the shutter being over the iron-nickel crucible 204. At the same time, masking plate 222 is rotated to a position which provides the appropriate masking for the deposition of a magnetic film or an array thereof according to the lamination product being deposited. The magnetic film or films as then deposited may be individually coated with silicon monoxide from the insulation crucible 206 by appropriate movement of the shutter plate 218. In addition, the masking plate 222 may be rotated to deposit a complete layer of insulation from crucible 206. This forms the desired layer of insulation on which a winding may be deposited from the melt in crucible 208 after rotation of the shutter and masking plates 218 and 222 to complete effective closure of crucibles 204 and 206 and to give the desired winding configuration. The process may proceed by alternate depositions of insulation and copper each with appropriate registration masking to effect the desired product which results as an integral unit since each deposited substance is automatically affixed by adherence to that on which it is deposited.

Whenever a "backing" layer, such as 160 in FIGURE 2, is desired for the product, it may be conveniently added after the laminated structure is removed from the deposition apparatus, or it can be effected by deposition while the structure is still in the apparatus since as above indicated the backing layer can be a magnetic film itself.

Figure 4:
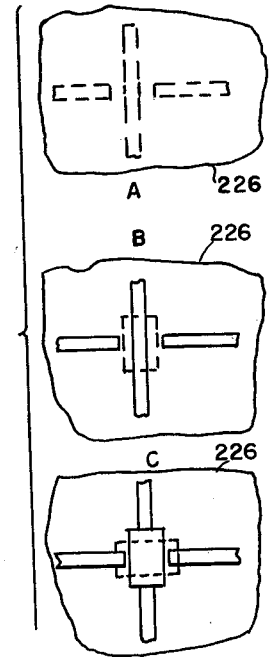
FIGURE 4 illustrates different steps involved in making conductor cross-overs with the apparatus of FIGURE 3.

As shown in FIGURE 2 on insulation layer 148, there may be times when it is necessary to cross over the conductors of the overall winding arrangement on any given layer of insulation. To effect this, the procedure indicated in FIGURE 4 may be followed. That is, to effect a cross-over of two conductors, the insulation layer 226 in FIGURE 4A is completely covered by the masking plate except for the areas shown in dotted lines. Copper conductors are then deposited within those dotted line areas to effect the solid line conductors shown in FIGURE 4B. Following this, the condensate is covered by masking except for the area shown by dotted lines in FIGURE 4B, and insulation is deposited within the confines of those dotted lines. After this, masking of all except the area within the dotted lines shown in FIGURE 4C is effected, and then the horizontal conductor in that figure is completed by deposition of winding material such as copper from crucible 208.

Figure 5:
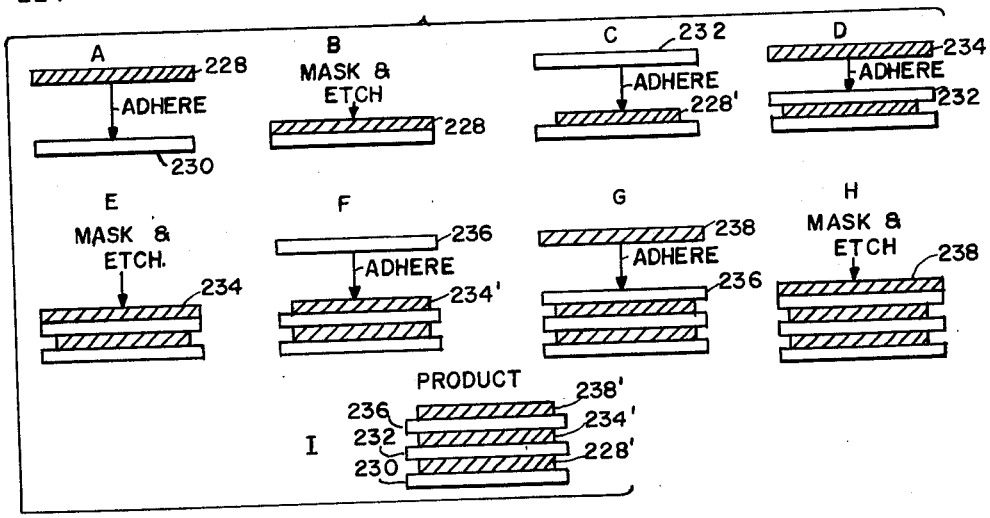
FIGURE 5 illustrates the different steps of an alternative method of this invention.

As indicated in the said parent application, the laminated structure as it includes alternate layers of insulation and printed circuitry, may be constructed outside of a vacuum, and then combined with one or more thin films or the like as required. In other words, the laminated products of FIGURES 1 and 2 as they exclude the thin films and substrate therefor, may be produced by cementing or pasting or otherwise sequentially bonding or adhering insulation and winding layers together to build the lamination, with each winding layer being subjected to a "printing" technique before being covered by an insulation layer, to effect the desired winding configuration. FIGURE 5 illustrates steps in a process for producing such a product. In FIGURE 5A, a layer 228 of winding metal such as copper, is affixed as by adherence to a base insulation layer 230. Following that as indicated in FIGURE 5B, the copper layer is appropriately masked and "printed" such as by etching to provide the winding configuration desired. A second layer of insulation 232 is then affixed to the printed copper layer 228' as shown in FIGURE 5C. The steps of FIGURES 5A, B, C, are then repeated as many times as required, for example once as shown in FIGURES 5D, E and F, with the subsequent steps in FIGURES 5G, H, being similar to those in FIGURES 5A, B, to produce the product shown in FIGURE 5I wherein each of the layers 228', 234' and 238' are printed circuits having respective desired winding configurations in proper registration with one another with each being separated from the other by an intervening insulation layer 232, 236 and resting on the base insulation layer 230.

Figure 6:
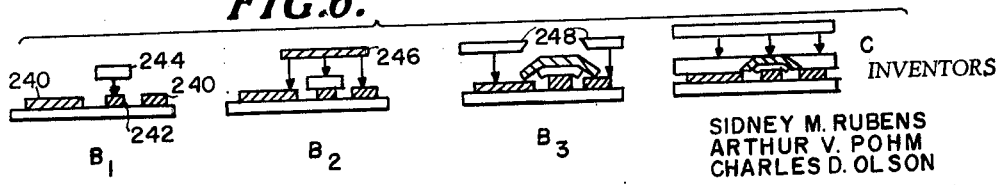
FIGURE 6 shows steps which may be employed in the method of FIGURE 5 for producing conductor cross-overs.

If conductor cross-overs need to be made in any given winding layer during the process illustrated in FIGURE 5, this can be accomplished as illustrated in FIGURE 6 which presupposes that such a cross-over is desired for the first winding layer 228. The masking and etching step in FIGURE 5B is then of such a nature that the conductor 240 in FIGURE 6B$_1$ is made discontinuous so that the other conductor 242, which conductor 240 is to cross over, may be made continuous in the cross-over area. Then, a piece of insulation material 244, may be adhered to the conductor 242 with extensions to each side of that conductor. In this way, a strip 246 of conducting material may be laid over the insulation 244 and adhered to the discontinuous ends of conductor 240 as shown in FIGURE 6B$_2$. The overlaid conducting strip 246 is pressed into place so that its ends contact both parts of the conductor 240, and a good electrical connection may be made by solder, conductive silver paste, micro-spot welding, etc., or the conductive strip 246 may be electroplated into place. Since the cross-over is likely to cause some objectionable hump, an additional layer 248 of insulation material may be adhered to the winding layer, as shown in FIGURE 6B$_3$, to effect leveling. To it another insulation layer may be adhered as indicated in FIGURE 6C, the same as in FIGURE 5C.

Figure 7:
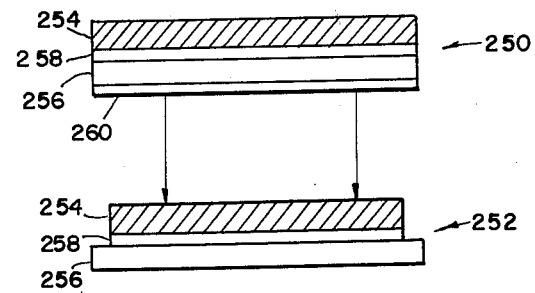
FIGURE 7 illustrates a modification of the method of FIGURE 5.

Although FIGURE 5 illustrates the process of making a lamination by affixing insulation and winding layers successively, the product so produced may also be made in accordance with FIGURE 7. In this figure, each of the preformed sub-laminations 250 and 252 includes a winding layer 254 and an insulation layer 256 already bonded together as by cement 258. The winding layer in the upper sub-lamination 250 need not be printed before combining the two sub-laminations, but on the other hand, the winding configuration may already be effected for the upper sub-lamination. In any event, of course the winding layer in the lower sub-lamination is printed to a desired winding configuration before the two sub-laminations are placed in proper registration and adhered together as for example by a layer 60 of cement disposed on the bottom of the upper insulation layer. When the two sub-laminations are pressed together, the cement therebetween oozes into the areas between the conductors of the printed winding in the lower sub-lamination.

In producing the embodiments resulting from the steps illustrated in FIGURES 5, 6 and 7, the insulation material may be for example "Mylar," or polyethylene; and thermo-plastic cement, preferably with heat and pressure, may be employed for adhering the layers together. Preferably the winding layers are of copper; aluminum or other conductive materials may also be employed. It is to be understood that no limitation is intended by the mention above of particular materials usable.

Thus it is apparent that there is provided by this invention methods in which the various objects and advantages herein set forth are successfully achieved.

Modifications of this invention now described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A method for making a magnetic device comprising forming at least one discrete area of magnetic material on a substrate, evaporatively forming in a vacuum a printed circuit winding adjacent the magnetic area and substrate combination, evaporatively forming in a vacuum a layer of electrical insulation adjacent said winding, evaporatively forming in a vacuum a second printed circuit winding on said insulation layer, evaporatively forming in a vacuum a second insulation layer on said second winding, and evaporatively forming in a vacuum a third printed circuit winding on said second layer of insulation to form a laminated magnetic structure.

2. A method as in claim 1 wherein said discrete areas are evaporated on the substrate through a mask in a vacuum.

3. A method as in claim 1 wherein at least the first mentioned printed circuit winding is evaporatively formed in a vacuum on the magnetic material side of said substrate, and further including evaporatively forming in a vacuum a third insulation layer between the magnetic material and the first mentioned printed circuit winding.

4. A method as in claim 3 wherein said magnetic material has an easy axis of magnetization, and including evaporatively forming in a vacuum at least two more layers, respectively of insulation and printed circuit windings, adjacent said substrate with the forming of at least two of all of said windings being such that the current conducting lengths thereof most adjacent said magnetic material are orthogonal with said easy axis.

5. A method as in claim 3 wherein a plurality of discrete areas of bistable magnetic material are formed upon said substrate by depositon in a vacuum with each of said insulation layers and windings being successively deposited in said vacuum, and including the formation of at least one cross-over of two printed circuit winding conductors between two immediately successive insulation layers comprising masking the first of said successive insulaton layers so that upon deposition of said printed circuit conductors one of the conductors is continuous at the cross-over point while the other line is discontinuous thereat forming a space on both sides of said one conductor, depositing metallic material onto the first of the said successive insulation layers to form said printed circuit conductors in accordance with said masking, masking over said printed circuit conductors so deposited except for an area adjacent the cross-over point, depositing insulation in accordance with the last masking, masking to form an open area between the discontinuous ends of said other printed circuit conductor, and depositing a metallic cross-over line connecting said ends before the said second successive insulation layer is deposited.

6. A method as in claim 3 wherein the magnetic material has a preferred axis of magnetization, and wherein at least one of said windings is formed to have at least one current conducting length thereof at an acute angle with said preferred axis.

7. A method as in claim 6 and further including evaporatively forming in a vacuum at least one more insulation layer and printed circuit winding on the third printed circuit winding, said magnetic material having a preferred axis of magnetization, the forming of three of said windings being such as to cause the current conducting length thereof to be at an acute angle relative to said preferred axis.

References Cited in the file of this patent
UNITED STATES PATENTS

| | | |
|---|---|---|
| 2,441,960 | Eisler | May 25, 1948 |
| 2,711,983 | Hoyt | June 28, 1955 |